United States Patent
Chen

(10) Patent No.: US 8,144,462 B2
(45) Date of Patent: Mar. 27, 2012

(54) LOCK AND ELECTRONIC DEVICE USING THE SAME

(75) Inventor: Song-Ya Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 171 days.

(21) Appl. No.: 12/788,288

(22) Filed: May 26, 2010

(65) Prior Publication Data

US 2011/0075332 A1 Mar. 31, 2011

(51) Int. Cl.
*H05K 5/00* (2006.01)
*H05K 7/00* (2006.01)
*A47B 81/00* (2006.01)
*A47F 7/00* (2006.01)

(52) U.S. Cl. ......... 361/679.57; 361/679.58; 361/679.59; 312/223.1; 312/223.2; 248/220.31; 248/220.41; 211/26

(58) Field of Classification Search .............. 211/26; 361/679.57–679.59, 679.41–679.44, 726–727, 361/732, 740–747, 759; 312/223.1, 223.2, 312/223.3; 248/220.31, 220.41
See application file for complete search history.

(56) References Cited

U.S. PATENT DOCUMENTS

| | | | | |
|---|---|---|---|---|
| 4,679,415 | A | * | 7/1987 | Spratt ............................ 70/118 |
| 5,870,281 | A | * | 2/1999 | Kim ....................... 361/679.57 |
| 7,921,684 | B2 | * | 4/2011 | Okuno et al. .................. 70/186 |
| 2003/0061849 | A1 | * | 4/2003 | Yeh ............................. 70/279.1 |
| 2011/0080707 | A1 | * | 4/2011 | Mahaffey et al. ........ 361/679.57 |

* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

A lock is applied in an electronic device including a main body and a display. The display includes a first hook able to pass through the main body. The lock includes a base, a rack, a shaft and a gear. The rack is slidably connected to the base and includes a second hook. The shaft is secured to the base. The gear is rotatably connected to the shaft and engages the rack. The gear defines a latching slot to receive a portion of a key, which allows the gear to rotate together with the key to cause the rack to slide. The second hook is moveable together with the rack to a position where the second hook engages the first hook to lock the display to the main body. An electronic device using the lock is also provided.

16 Claims, 7 Drawing Sheets

US 8,144,462 B2

LOCK AND ELECTRONIC DEVICE USING THE SAME

BACKGROUND

1. Technical Field

The present disclosure relates to locks and electronic devices, and particularly, to a lock and an electronic device using the lock.

2. Description of Related Art

Users may leave an electronic device, for example a portable computer, unattended to take care of other matters, making information stored in the electronic device vulnerable to be viewed by others. A password can be used to lock the electronic device. However, someone may figure out the password.

BRIEF DESCRIPTION OF THE DRAWINGS

The components of the drawings are not necessarily drawn to scale, the emphasis instead being placed upon clearly illustrating the principles of a lock and an electronic device using the same. Moreover, in the drawings, like reference numerals designate corresponding parts throughout several views.

DETAILED DESCRIPTION

Figure 1:
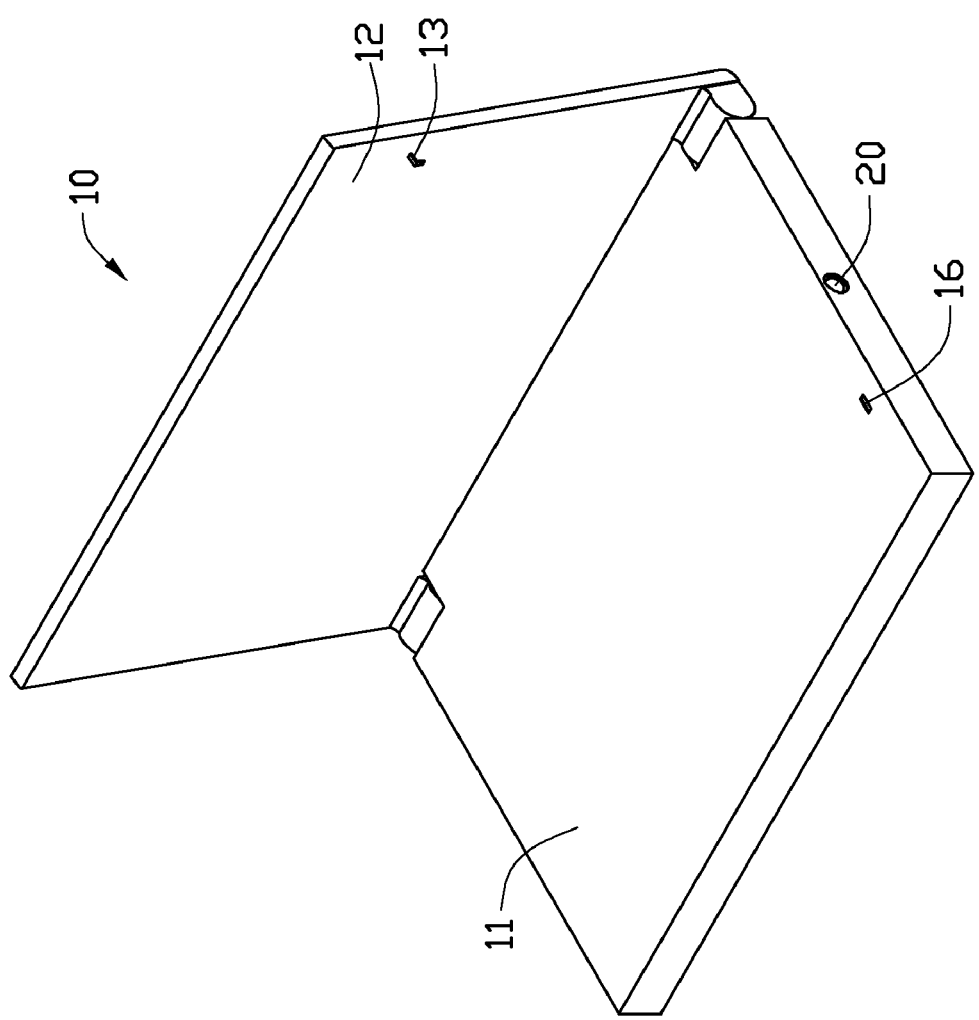
FIG. 1 is an isometric view of an electronic device in accordance with an exemplary embodiment, showing the electronic device in an open state.
Figure 2:
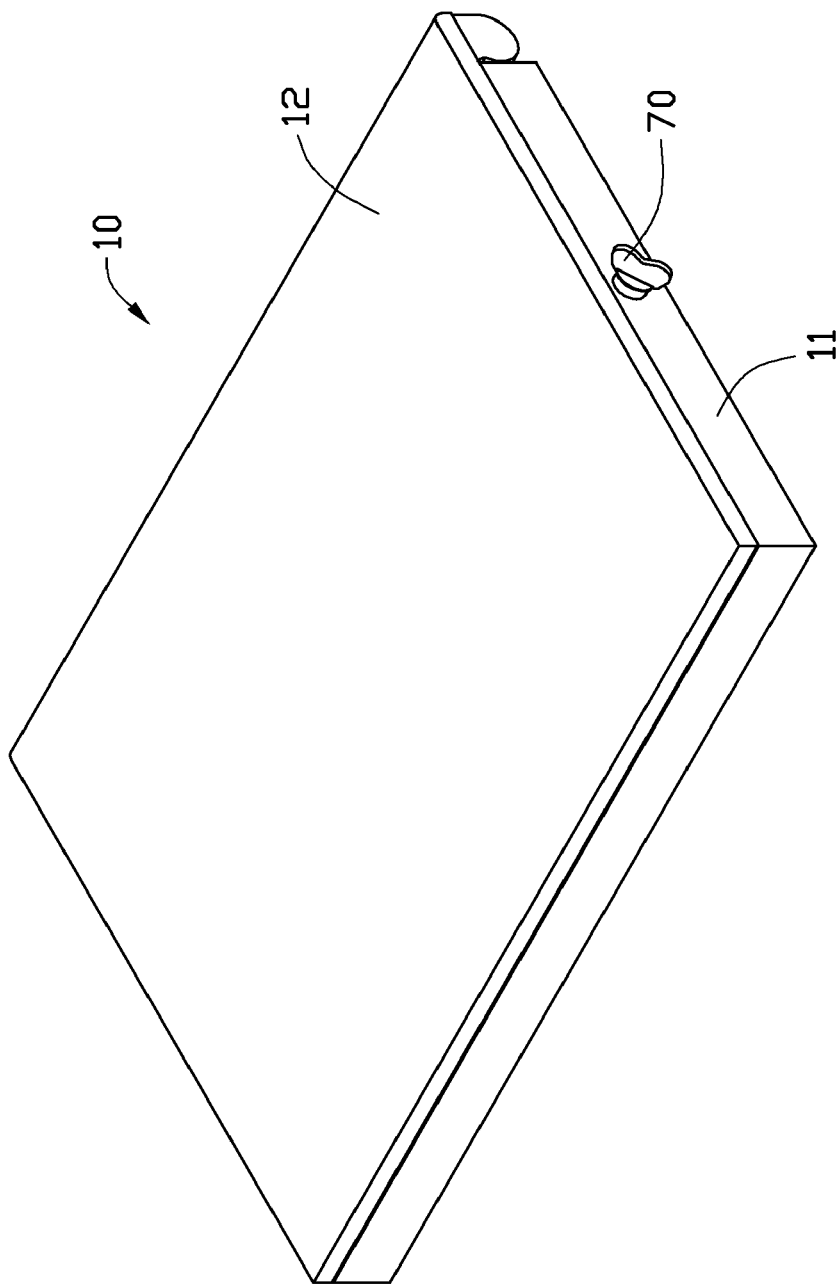
FIG. 2 is another isometric view of the electronic device of FIG. 1, showing the electronic device in a closed state.

Referring to FIGS. 1-2, an electronic device 10 includes a main body 11 and a display 12 rotatably connected to the main body 11. A lock 20 is mounted in the main body 11. A first hook 13 protrudes from a surface of the display 12 facing the main body 11. The main body 11 defines a through hole 16 adapted to the first hook 13. To lock the display 12 to the main body 11, the display 12 is rotated to cover the main body 11, causing the first hook 13 to pass through the through hole 16, and the lock 20 is then manipulated to engage the first hook 13, the display 12 is thus locked to the main body 11.

Figure 3:
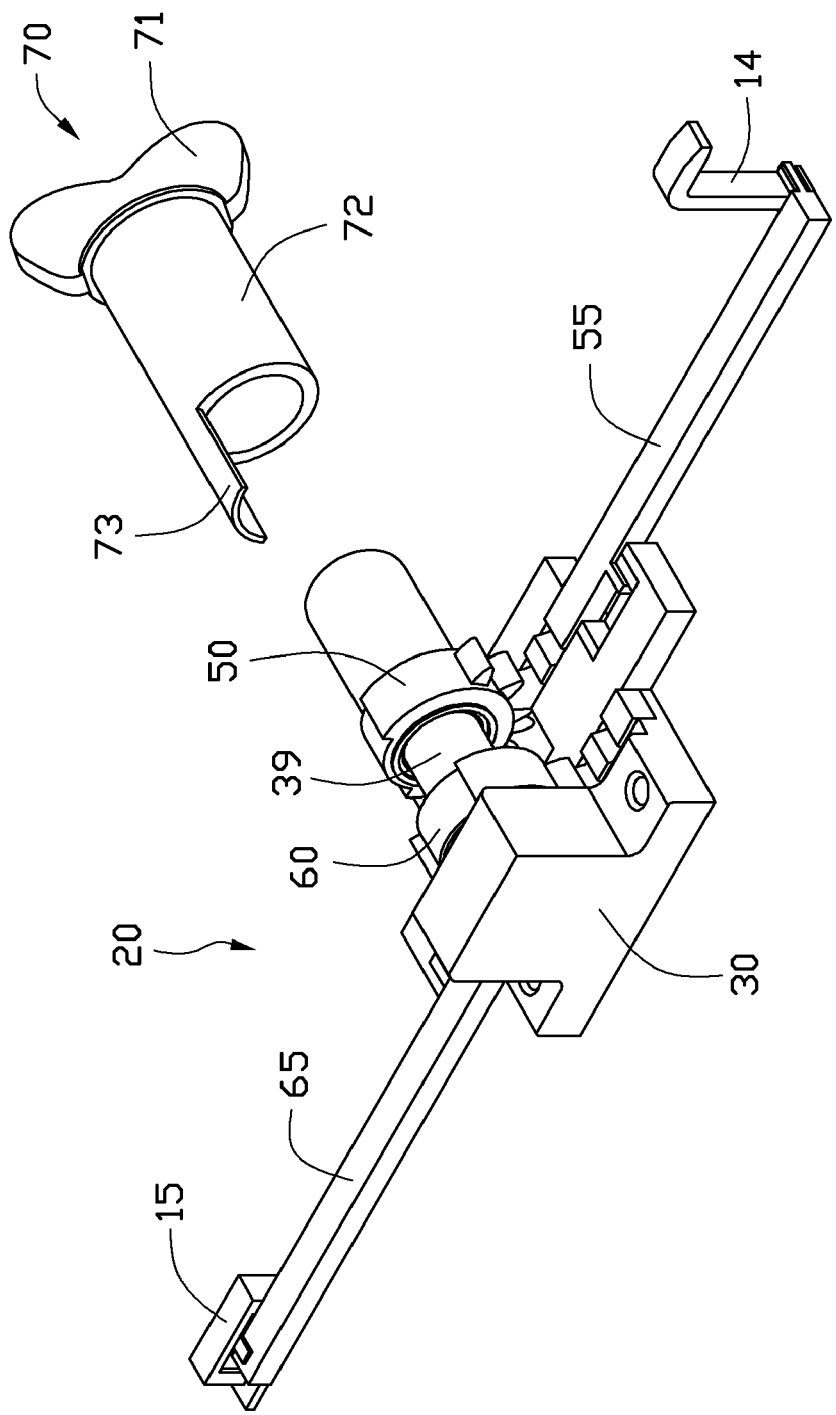
FIG. 3 is a partially exploded, perspective view of a lock used in the electronic device of FIG. 1.
Figure 4:
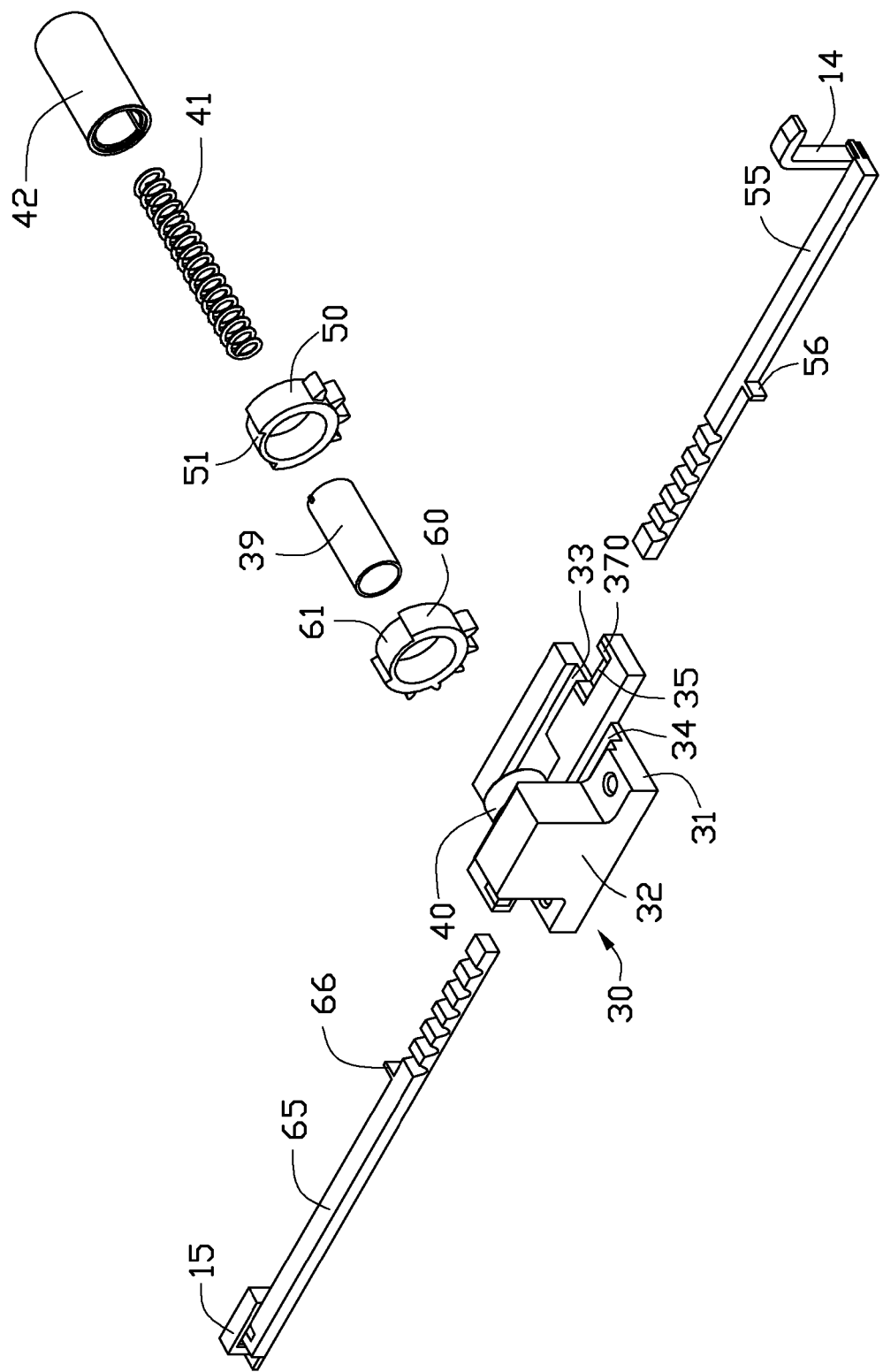
FIG. 4 is an exploded, perspective view of the lock of FIG. 3.
Figure 5:
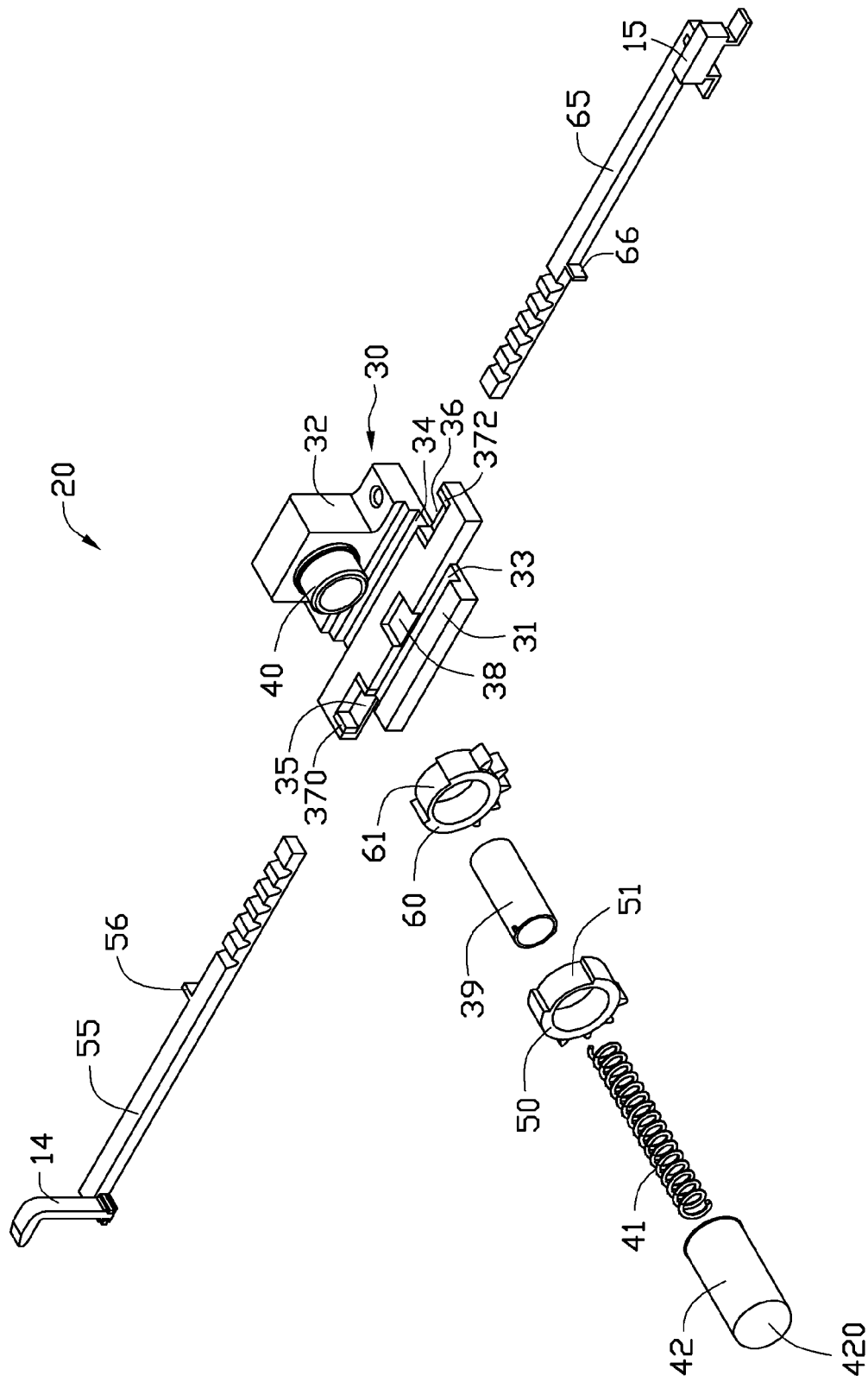
FIG. 5 is similar to FIG. 4, but viewed from another viewpoint.

Referring also to FIGS. 3-5, the lock 20 includes a base 30, a first gear 50, a first rack 55, a second gear 60, and a second rack 65. A first shaft 39 and a second shaft 40 are connected to the base 30. A first sleeve 42 is slideably arranged around the first shaft 39, and the first gear 50 is rotatably fixed in place on the first sleeve 42, the first gear 50 is thus rotatably connected to the first shaft 39 by the first sleeve 42. The second gear 60 is rotatably fixed in place on the second shaft 40. The first rack 55 and the second rack 65 are slidably connected to the base 30. The first gear 50 can engage the first rack 55, and the second gear 60 can engage the second rack 65.

The base 30 includes a bottom plate 31 and a sidewall 32. The bottom plate 31 defines a first sliding slot 33 and a second sliding slot 34. The second sliding slot 34 is adjacent to the sidewall 32. The bottom plate 31 also defines a first recessed portion 35 and a second recessed portion 36 communicating with the first sliding slot 33 and the second sliding slot 34, respectively. A pair of first resisting blocks 370 is mounted on the opposite sidewalls of the first recessed portion 35, respectively, and a pair of second resisting blocks 372 is mounted on the opposite sidewalls of the second recessed portion 36. In the embodiment, the first resisting blocks 370 and the second resisting blocks 372 are magnets. The first rack 55 can slide along the first sliding slot 33 and can be attracted by the first resisting blocks 370. The second rack 65 can slide along the second sliding slot 34 and can be attracted by the second resisting blocks 372. The bottom plate 31 further defines a third recessed portion 38 communicating with the first sliding slot 33. The third recessed portion 38 is arranged between the first sliding slot 33 and the second sliding slot 34. A portion of the first gear 50 can be received in the third recessed portion 38, and the first gear 50 can be further caused to slide in the third recessed portion 38.

In the embodiment, the first shaft 39 and the second shaft 40 are generally hollow and cylindrical. The first shaft 39 includes two opposite open ends (not labeled), and the second shaft 40 includes two opposite open ends (not labeled). The diameter of the first shaft 39 is less than that of the second shaft 40. One end of the second shaft 40 is secured to the sidewall 32. The first shaft 39 is fixed to the second shaft 40. In an alternative embodiment, the first shaft 39 is integrally formed with the second shaft 40. The lock 20 further includes an elastic member 41. In the embodiment, the elastic member 41 is a coil spring. The first sleeve 42 is generally hollow and cylindrical. The first sleeve 42 includes a closed end 420. The diameter of the first sleeve 42 is greater than that of the first shaft 39. The elastic member 41 is received in the first shaft 39 and the second shaft 40. One end of the elastic member 41 resists the closed end 420 of the first sleeve 42 and an opposite end resists the sidewall 32.

The lateral surface of the first gear 50 defines a first latching slot 51, and the lateral surface of the second gear 60 defines a second latching slot 61. The shape of the first latching slot 51 is substantially the same as the second latching slot 61.

A first limiting projection 56 protrudes from one sidewall of the first rack 55. The first limiting projection 56 stays within the first recessed portion 35. The first limiting projection 56 can be attracted by the first resisting blocks 370. When the first limiting projection 56 is caused to contact one of the first resisting blocks 370, the one of the first resisting blocks 370 attracts the first limiting projection 56, and the sliding movement of the first rack 55 is thus stopped. A second hook 14 matching the first hook 13 protrudes from the first rack 55. The second hook 14 is moveable together with the first rack 55 to a position where the second hook 14 engages the first hook 13 to lock the display 12 to the main body 11.

A second limiting projection 66 protrudes from one sidewall of the second rack 65. The second limiting projection 66 stays within the second recessed portion 36. The second limiting projection 66 can be attracted by the second resisting blocks 372. When the second limiting projection 66 is caused to contact one of the second resisting blocks 372, the one of the second resisting blocks 372 attracts the second limiting projection 66, and the sliding movement of the second rack 65 is thus stopped. A rechargeable battery 15 is mounted on the second rack 65. The rechargeable battery 15 is moveable together with the second rack 65 to a position where the rechargeable battery 15 is electrically connected to an electronic board (not shown) of the electronic device 10, thus providing power to the electronic device 10.

A key 70 matching the lock 20 is provided. The key 70 includes a handle 71 and a second sleeve 72 secured to the handle 71. A latching projection 73 protrudes from one end of the second sleeve 72. The shape of the latching projection 73 is adapted to the first latching slot 51 and the second latching slot 61.

Figure 6:
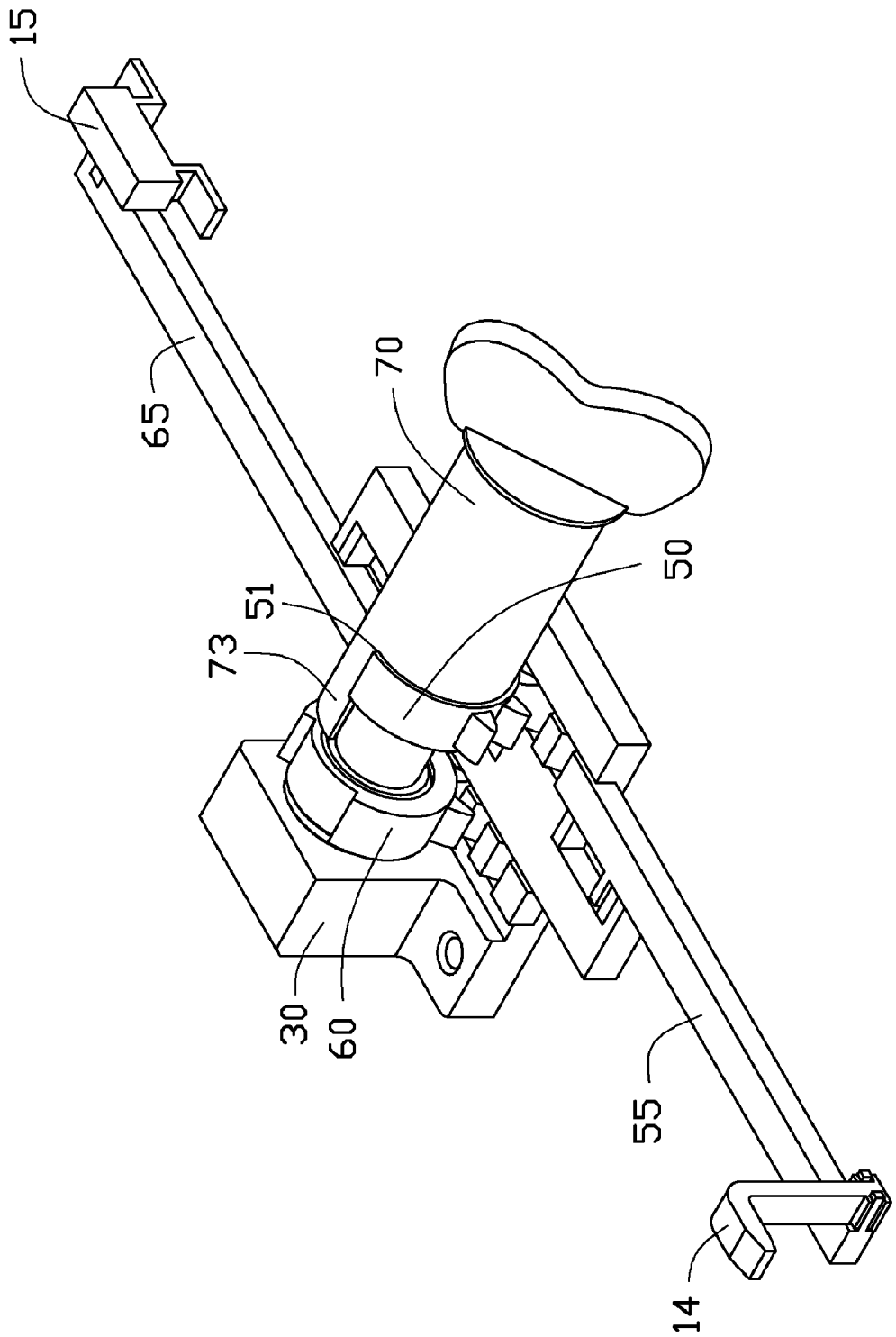
FIG. 6 is an isometric view of the lock of FIG. 3, showing the lock in a first state.

Referring also to FIG. 6, to lock the display 12 to the main body 11, the display 12 is rotated to cause the first hook 13 to pass through the through hole 16. The key 70 is then inserted into the main body 11. While inserting the key 70, the inner lateral surface of the second sleeve 72 engages with the outer lateral surface of the first sleeve 42, which guides the key 70 to move with respect to the first sleeve 42 until the latching projection 73 is received in the first latching slot 51. The latching projection 73 engages the first latching slot 51 and then moves together with the rotation of the key 70 to cause the first gear 50 to rotate. Due to the engagement of the first gear 50 and the rack 55, the first rack 55 slides away from the base 30 until the first limiting projection 56 contacts the first resisting block 370. At this point, the second hook 14 engages the first hook 13. The display 12 is thus locked to the main body 11. The key 70 can then be pulled out of the main body 11.

To open the electronic device 10, the key 70 is employed again to cause the second hook 14 to disengage from the first hook 13. It should be noted that in the embodiment no matter whether the electronic device 10 is in a closed state or an open state, the first latching slot 51 does not align with the second latching slot 61.

Figure 7:
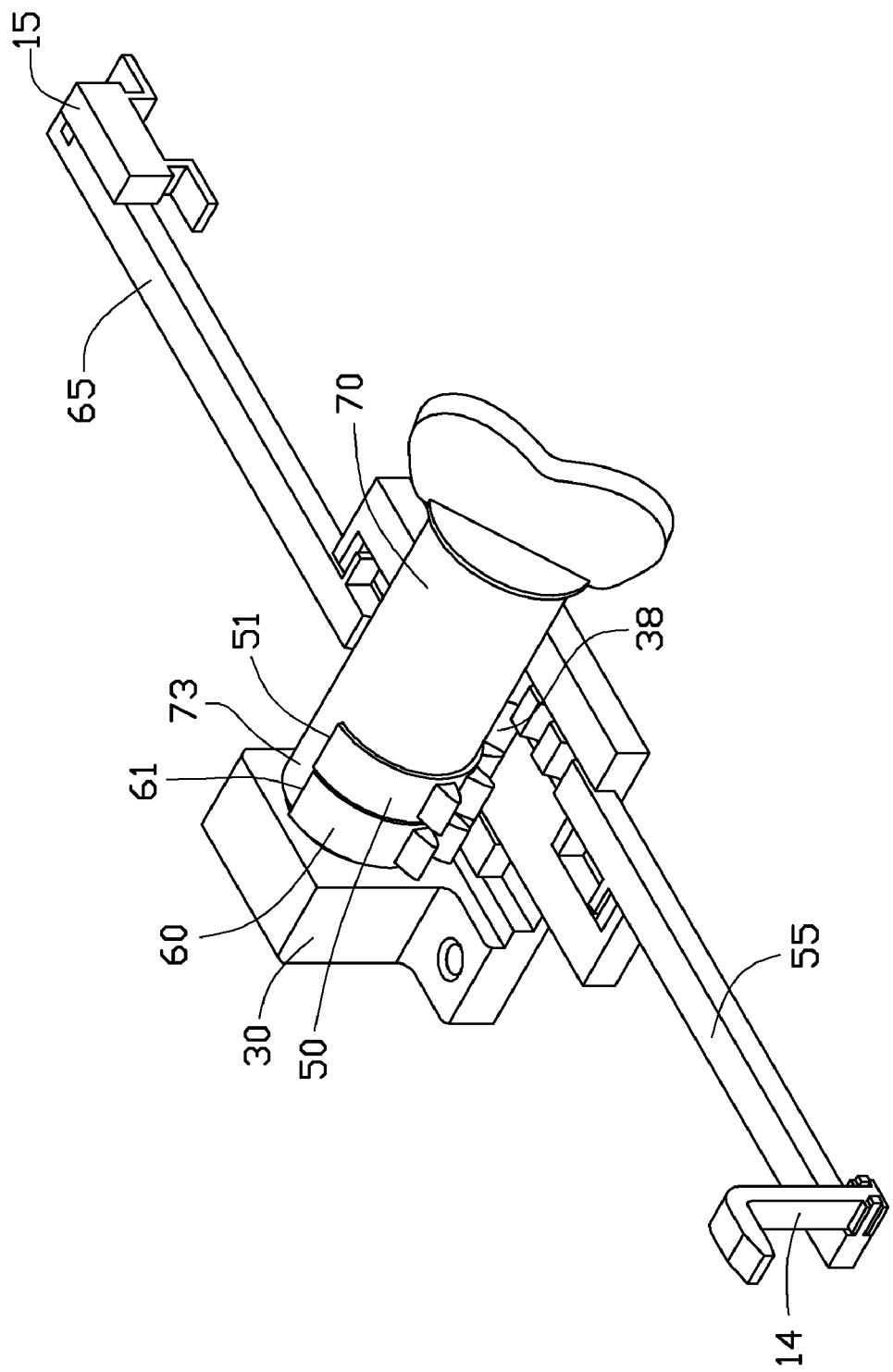
FIG. 7 is similar to FIG. 6, but showing the lock in a second state.

Referring also to FIG. 7, to provide power to the electronic device 10, the key 70 is inserted into the main body 11 until the latching projection 73 is received in the first latching slot 51. The key 70 is then pushed to cause the first sleeve 42 and the first gear 50 to move toward the second gear 60 along the first shaft 39. While pushing the key 70, the elastic member 41 is compressed. After a lower portion of the first gear 50 is received in the third recessed portion 38, the first gear 50 disengages from the first rack 55. After that, the key 70 is then rotated to cause the first latching slot 51 to align with the second latching slot 61. The key 70 is then further pushed to cause the end of the latching projection 73 to move into the second latching slot 61. At this point, the second gear 60 can be rotated together with the rotation of the key 70. The rotation of the second gear 60 causes the second rack 65 to slide away from the base 30 until the second limiting projection 66 contacts the second resisting block 37. At this point, the rechargeable battery 15 is electrically connected to the electronic board of the electronic device 10, the rechargeable battery 15 can thus provide power to the electronic device 10. The key 70 can then be pulled out of the main body 11. The elastic member 41 rebounds to cause the first gear 50 and the first sleeve 42 to return to their original states.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A lock applied in an electronic device, the electronic device comprising:
   a main body and a display, the display comprising a first hook able to pass through the main body, the lock comprising:
   a base, the base defines a first recessed portion, a pair of first resisting blocks is mounted on opposite sidewalls of the first recessed portion;
   a first rack slidably connected to the base and comprising a second hook engageable with the first hook, the first rack comprises a first limiting projection, the first limiting projection stays within the first recessed portion and can be attracted by the first resisting blocks;
   a shaft secured to the base;
   a first gear rotatably connected to the shaft and engaging the first rack, wherein the first gear defines a first latching slot to receive a portion of a key, which allows the first gear to rotate together with the key to cause the first rack to slide, the second hook is moveable together with the first rack to a position where the second hook engages the first hook to lock the display to the main body; and
   a second rack and a second gear, wherein the second rack is slideably connected to the base and comprises a rechargeable battery, the second gear is rotatably fixed in place on the shaft and engages the second rack, the second gear defines a second latching slot to receive the portion of the key, which allows the second gear to rotate with the key to cause the second rack to slide, the rechargeable battery is moveable together with the second rack to a position where the rechargeable battery can provide power to the electronic device.

2. The lock as described in claim 1, wherein the base defines a second recessed portion, a pair of second resisting blocks is mounted on opposite sidewalls of the second recessed portion, the second rack comprises a second limiting projection, the second limiting projection stays within the second recessed portion and can be attracted by the second resisting blocks.

3. The lock as described in claim 2 further comprising a sleeve slidably arranged around the shaft, wherein the first gear is rotatably fixed in place on the sleeve, the first gear is thus rotatably connected to the shaft by the sleeve.

4. The lock as described in claim 3 further comprising an elastic member, wherein the shaft is hollow, the sleeve comprises a closed end, and the elastic member is received in the shaft and resists the closed end of the sleeve.

5. The lock as described in claim 4, wherein the base comprises a bottom plate and a sidewall secured to the bottom plate, one end of the shaft is secured to the sidewall, the bottom plate defines a first sliding slot and a second sliding slot, the second sliding slot is adjacent to the sidewall, the first rack slides along the first sliding slot, and the second rack slides along the second sliding slot.

6. The lock as described in claim 5, wherein the first recessed portion and the second recessed portion are formed on the bottom plate, the first recessed portion communicates with the first sliding slot, and the second recessed portion communicates with the second sliding slot.

7. The lock as described in claim 6, wherein the bottom plate defines a third recessed portion between the first sliding slot and the second sliding slot, the third recessed portion communicates with the first sliding slot.

8. The lock as described in claim 2, wherein the first resisting blocks and the second resisting blocks are magnets.

9. An electronic device, comprising:
   a main body defining a through hole;
   a display rotatably mounted to the main body and comprising a first hook able to pass through the through hole; and
   a lock, comprising:
   a base, the base defines a first recessed portion, a pair of first resisting blocks is mounted on opposite sidewalls of the first recessed portion;
   a first rack slidably mounted on the base and comprising a second hook engageable with the first hook, the first rack comprises a first limiting projection, the first limiting projection stays within the first recessed portion and can be attracted by the first resisting blocks;

a shaft secured to the base; and a first gear rotatably connected to the shaft and engaging the first rack, wherein the first gear defines a first latching slot to receive a portion of a key, which allows the first gear to rotate together with the key to cause the first rack to slide, the second hook is moveable together with the first rack to a position where the second hook engages the first hook to lock the display to the main body; and a second rack and a second gear, the second rack is slideably connected to the base and comprises a rechargeable battery, the second gear is rotatably fixed in place on the shaft and engages the second rack, the second gear defines a second latching slot to receive the portion of the key, which allows the second gear to rotate with the key to cause the second rack to slide, the rechargeable battery is moveable together with the second rack to a position where the rechargeable battery can provide power to the electronic device.

10. The electronic device as described in claim 9, wherein the base defines a second recessed portion, a pair of second resisting blocks is mounted on opposite sidewalls of the second recessed portion, the second rack comprises a second limiting projection, the second limiting projection stays within the second recessed portion and can be attracted by the second resisting blocks.

11. The electronic device as described in claim 10, wherein the lock further comprises a sleeve slidably arranged over the shaft, the first gear is rotatably fixed in place on the sleeve, the first gear is thus rotatably connected to the shaft by the sleeve.

12. The electronic device as described in claim 11, wherein the lock further comprises an elastic member, wherein the shaft is hollow, the sleeve comprises a closed end, and the elastic member is received in the shaft and resists the closed end of the sleeve.

13. The electronic device as described in claim 12, wherein the base comprises a bottom plate and a sidewall, one end of the shaft is secured to the sidewall, the bottom plate defines a first sliding slot and a second sliding slot, the second sliding slot is adjacent to the first sliding slot, the first rack slides along the first sliding slot, and the second rack slides along the second sliding slot.

14. The electronic device as described in claim 13, wherein the first recessed portion and the second recessed portion are formed on the bottom plate, the first recessed portion communicates with the first sliding slot, and the second recessed portion communicates with the second sliding slot.

15. The electronic device as described in claim 14, wherein the bottom plate defines a third recessed portion between the first sliding slot and the second sliding slot, the third recessed portion communicates with the first sliding slot.

16. The electronic device as described in claim 10, wherein the first resisting blocks and the second resisting blocks are magnets.

* * * * *